US005896096A

United States Patent [19]

Kim

[11] Patent Number: 5,896,096

[45] Date of Patent: Apr. 20, 1999

[54] PAGING RECEIVER AND A SEQUENTIAL VIBRATING METHOD THEREFOR

[75] Inventor: Jong-Kwang Kim, Kyungki-do, Rep. of Korea

[73] Assignee: SamSung Electronics Co., Ltd., Kyungki-do, Rep. of Korea

[21] Appl. No.: 08/685,587

[22] Filed: Jul. 24, 1996

[30] Foreign Application Priority Data

Jul. 24, 1995 [KR] Rep. of Korea ........................ 95-21900

[51] Int. Cl.$^6$ ........................ H04Q 7/18

[52] U.S. Cl. ........................ 340/825.46; 340/825.44; 340/311.1; 340/407.1; 455/38.2; 455/38.4; 455/140; 370/314

[58] Field of Search ........................ 340/825.46, 825.44, 340/825.69, 825.48, 825.72, 311.1, 407.1; 455/458, 426, 31.1, 31.2, 38.2, 38.5, 38.4, 140; 370/310, 313, 314

[56] References Cited

U.S. PATENT DOCUMENTS

| | | | |
|---|---|---|---|
| 4,352,091 | 9/1982 | Yamasaki | 340/311.1 |
| 4,918,438 | 4/1990 | Yamasaki | 340/825.46 |
| 5,172,092 | 12/1992 | Nguyen et al. | 340/825.44 X |
| 5,272,475 | 12/1993 | Eaton et al. | 340/825.46 X |
| 5,293,161 | 3/1994 | MacDonald et al. | 340/825.46 |
| 5,471,103 | 11/1995 | Fujii . | |
| 5,508,688 | 4/1996 | Mochizuki | 340/825.44 |
| 5,646,589 | 7/1997 | Murray et al. | 340/825.46 X |

*Primary Examiner*—Brian Zimmerman

*Assistant Examiner*—William H. Wilson, Jr.

*Attorney, Agent, or Firm*—Robert E. Bushnell, Esq.

[57] ABSTRACT

A paging receiver having two warning modes, i.e., an audible mode and a vibrating mode, is provided. A vibrating motor of the paging receiver receives a voltage for controlling the level or intensity of vibrations provided by the motor. Various vibration voltage levels are provided to a multiplexer, and the multiplexer is controlled to sequentially output the various vibration voltages applied thereto, wherein each succeeding vibration voltage output by the multiplexer has a voltage level higher than a preceding vibration voltage.

13 Claims, 3 Drawing Sheets

PAGING RECEIVER AND A SEQUENTIAL VIBRATING METHOD THEREFOR

CLAIM OF PRIORITY

This application makes reference to, incorporates the same herein, and claims all benefits accruing under 35 U.S.C §119 from an application entitled *Sequential Vibrating Method In A Paging Receiver* earlier filed in the Korean Industrial Property Office on Jul. 24, 1995, and there duly assigned Ser. No. 21900/1995 by that Office.

BACKGROUND OF THE INVENTION

1. Field of the Invention

The present invention relates to a paging receiver having a vibration mode, and more particularly to a paging receiver and a sequential vibrating method therefore wherein the vibration level of a motor is sequentially adjusted when a call is transmitted to a paging receiver operating in a vibration mode.

2. Description of the Related Art

Generally, a paging receiver is used to store a message received to its address, when a call, transmitted from an external telephone source, is received. To alert a user of the paging receiver that call has been received, the paging receiver may provide an audible alarm or tactual alarm, and at the same time a received message is displayed. The received message is also stored in an internal memory which can be accessed by the user pressing a read key, if necessary. When the paging receiver is operating in the audible alarm mode, a warning sound informing a user that a call has been received, is generated. When the paging receiver is operating in the tactual alarm mode the body of the paging receiver vibrates, so that the user can be alerted to a received call by the sensing the vibrations.

A conventional paging receiver may include an eccentrically rotating motor which causes the body of the paging receiver to vibrate due to the motor's change of its center of gravity as it rotates. One such paging receiver is discussed in U.S. Pat. No. 5,471,103 by Masahiro Fujii, entitled *Motor For Providing A Vibrating Action For A Radio Pager*. This patent discusses the how the change in mass of the of a rotor of the motor will increase the degree of vibration of the pager receiver.

Accordingly, other paging receivers provide a weak vibration level which may or may not be sensed by the user, either due to the user's sensitivity to the vibrations or due to how the paging receiver is carried. Additionally, a user may be easily startled by the sudden start of a vibration mode when a call is received by a paging receiver having a strong vibrational level.

SUMMARY OF THE INVENTION

It is an object of the present invention to provide and improved paging receiver and process for alerting a user of a paging receiver to reception of an incoming message.

It is another object to provide a paging receiver have a varying vibrating mode.

It is yet another object of the present invention to provide a paging receiver having a sequentially varying vibrating mode.

It is a further object of the present invention to provide a vibrating mode for a paging receiver, wherein the level of vibrations may be sequentially varied.

To achieve these and other objects of the present invention, a paging receiver having a plurality of warning modes, e.g., an audible mode and a vibrating mode, is provided. A vibrating motor of the paging receiver receives a voltage for controlling the level or intensity of vibrations provided by the motor. Various vibration voltage levels are provided to a multiplexer, and the multiplexer is controlled to sequentially output the various vibration voltages applied thereto, wherein each succeeding vibration voltage output by the multiplexer has a voltage level higher than a preceding vibration voltage.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
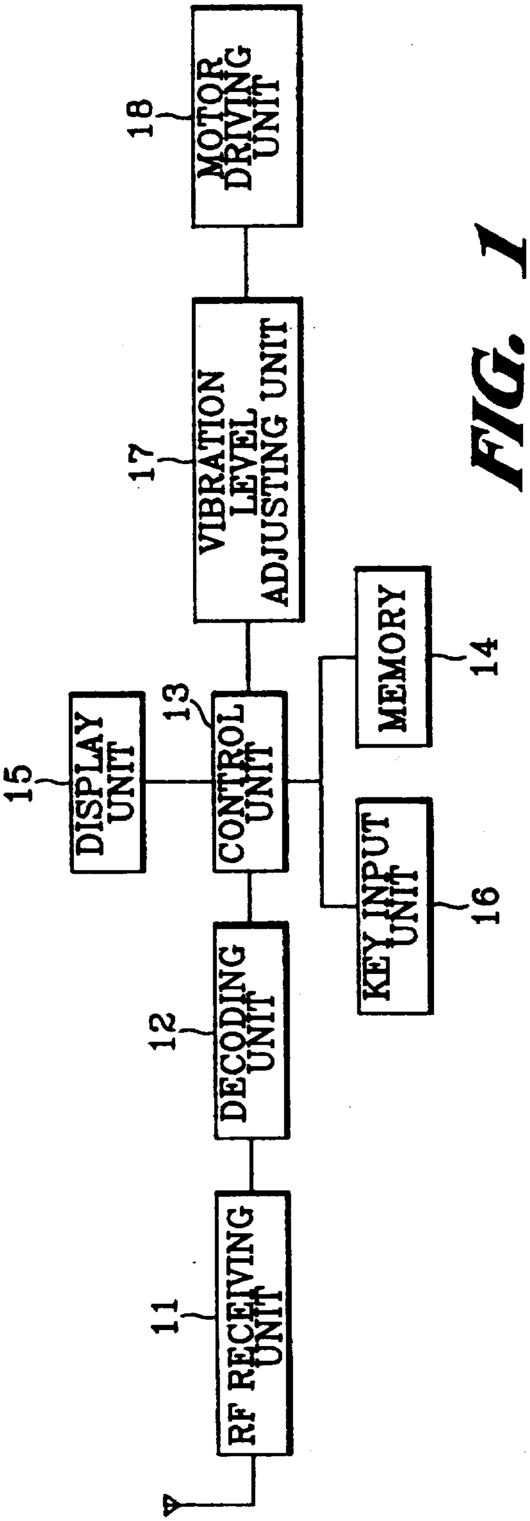
FIG. 1 is a block diagram illustrating one construction of a paging receiver constructed according to the principles of the present invention.

Turning now to the drawings and referring to FIG. 1, a block diagram illustrating one construction of a paging receiver according to the present invention is shown. A radio frequency (RF) receiving unit 11 receives radio paging call signal, converts the paging call signal frequency and performs modulation and waveform-shaping thereof to output the paging call signal as digital data. A decoding unit 12 includes a power controller (not shown) which controls power of the paging receiver and a BCH (Bose-Chaudhuri-Hocquenghem) decoder (not shown) which decodes data being received, the power controller setting a power control mode of the paging receiver. For example, during an idle mode, the power controller periodically controls supply of operating power and detects preamble data, and during a batch mode, detects word sync data and set frame data. In the meanwhile, the BCH decoder within decoding unit 12 decodes the detected frame data and converts the decoded data into original data. A control unit 13 receives the data output from decoding unit 12, and in response to the received data, controls a sequential level of vibration of a motor 18 during the vibration mode. Control unit 13 comprises a one-chip microprocessor having a read only memory fir storing an operating program of the paging receiver and a program for controlling the vibrating mode of operation the according to the principles of the present invention. The microprocessor of control unit 13 also has a random access memory for temporarily storing data generated during the prosecution of the aforementioned programs. A memory 14 stores inherent address information and frame information assigned within the paging receiver, an area of which has been assigned. A display unit 15 displays a message received from a calling party, and displays state information of the paging receiver by a display control signal output from control unit 13. A key input unit 16 has a mode selection key for selecting an audible mode or a vibration mode, a telephone number confirmation key for confirming a received telephone number as the received message and a completion key for storing and displaying a selected command. Key input unit 16 generates a key signal according to a corresponding key input to provide a corresponding signal to control unit 13. A vibration level adjusting unit 17 receives a vibration level control signal from control unit 13 and outputs sequentially increasing voltage levels as a vibration voltage. A motor driving unit 18 is driven by the vibration voltage output by vibration level adjusting unit 17.

Figure 2:
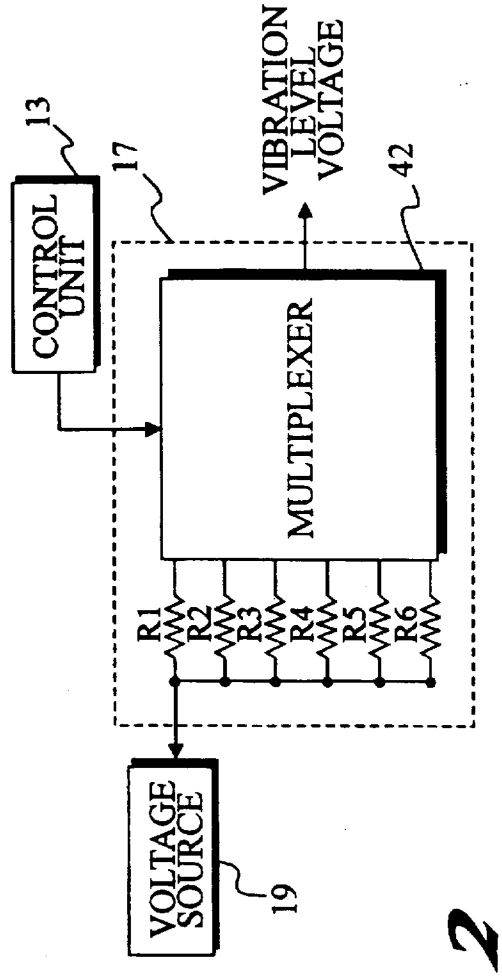
FIG. 2 is a detailed circuit diagram illustrating the vibration level adjusting unit 17 of FIG. 1, constructed according to the principles of the present invention.

FIG. 2 is a detailed circuit diagram illustrating the vibration level adjusting unit 17 of FIG. 1. As shown in FIG. 2, the vibration level adjusting unit 17 includes a plurality of resistors R1 through R6 for adjusting vibration level voltage input from a voltage source 19. Here, voltage source 19 can be a voltage provided by decoding unit 12 or by control unit 13. Resistors R1–R6 are chosen to vary, sequentially, in resistance value where R1 has the greatest resistance value and R6 has the lowest resistance value. Multiplexer 42 is controlled by control unit 13 to sequentially connect an output terminal thereof to resistors R1–R6, respectively. Accordingly, as the resistance values of the resistors connected to the output terminal of multiplexer 42 decrease in value, the vibration voltage output by multiplexer 42 increases proportionally. Therefore, when the vibration voltage level applied to motor drive unit 18 is provided by resistor R1, a low level vibration is generated by motor driving unit 18. As multiplexer 42 is stepped through resistors R1–R6, the vibration voltage level increases, such that a high level vibration is generated by motor driving unit 18 in response to the voltage provided by resistor R6.

Figure 3:
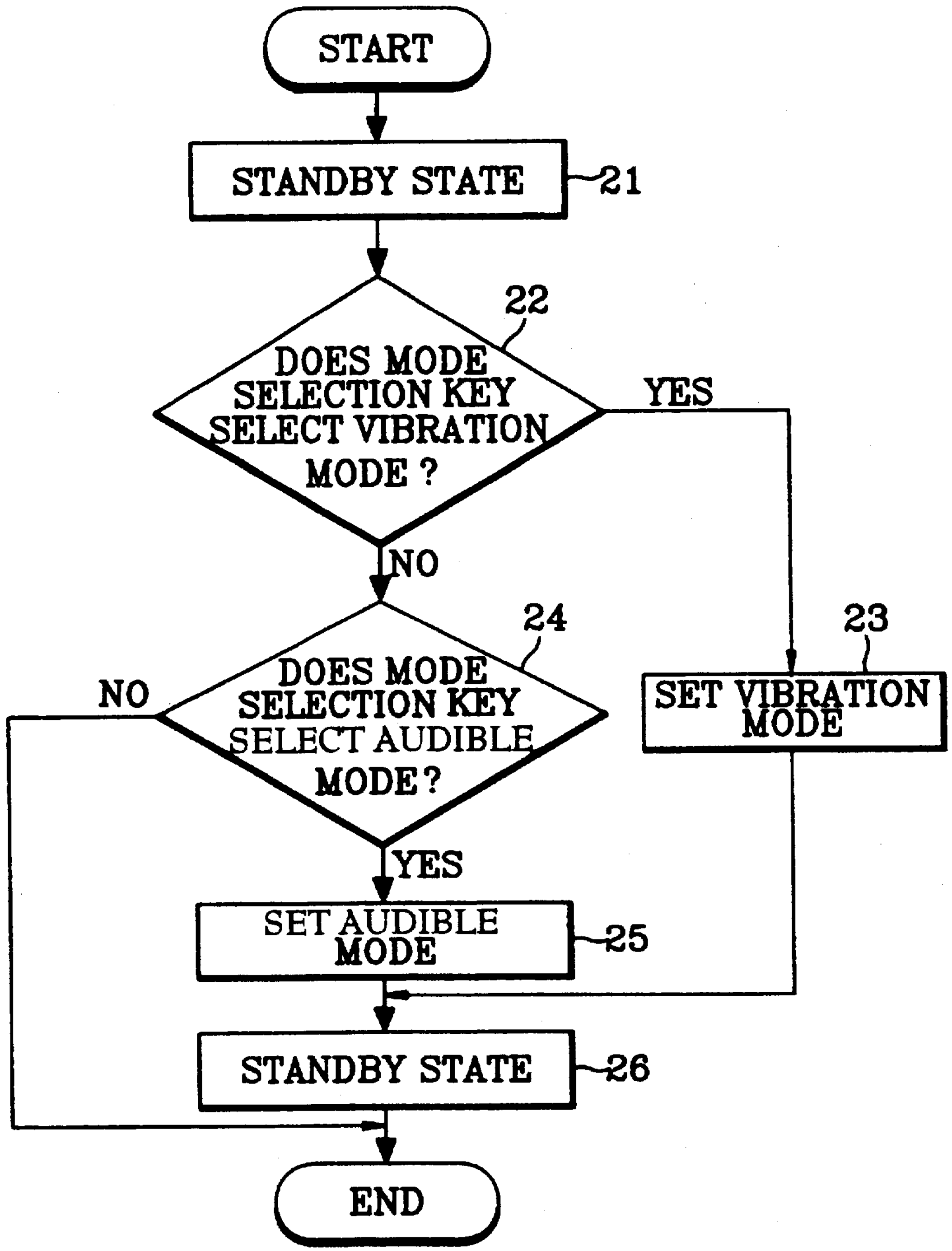
FIG. 3 is a flowchart illustrating control processes of setting a vibration mode constructed according to the principles of the present invention.

Referring to FIG. 3, the process for selecting the desired warning mode is illustrated. In step 21 control unit 13 is in a standby state during which control unit checks for activation of the mode selection key (not shown) of key input unit 16. In step 22 control unit 13 detects whether an activated mode selection key selects the vibration mode, and if not, checks in step 24 whether the activated mode selection key selects the audible mode. When the vibration mode is selected in step 22, control unit 13 sets up for operation in the vibration mode in step 23, and then returns to the standby state in step 26. When the audible mode is selected in step 24, control unit 13 sets up for operation in the audible mode in step 25, and then returns to the standby state in step 26. Here, the mode selection key may be a push button wherein the mode selected depends on the number of times the button was pressed, or the mode selection key may be a position switch which can be switched between the audible and vibration modes.

Figure 4:
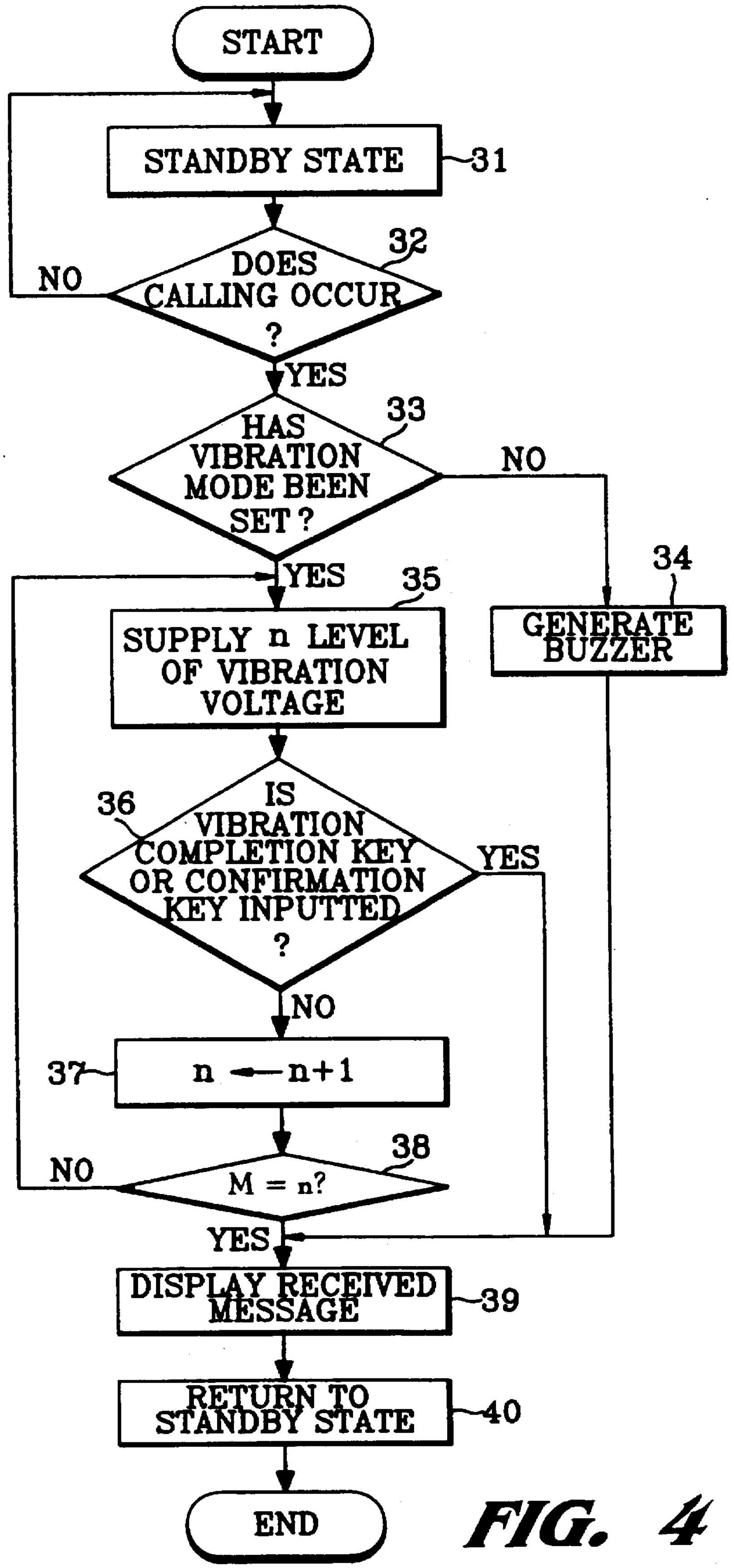
FIG. 4 is a flowchart illustrating control processes of generating a sequential level of vibration voltage constructed according to the principles of the present invention.

Referring now to FIG. 4, a flowchart of control processes for generating an alarm is illustrated. In step 31, control unit 13 is in a standby state. Periodically, control unit 13 is activated and checks for reception of a call, step 32. When no call is detected control unit is returned to the standby state, step 31. When a call is detected in step 32, control unit 13 checks in step 33 whether it is set to operate in the vibration mode. An audible alarm, such as a buzzer is generated in step 34 when control unit 13 is not set for vibration mode. Control unit 13 then controls display unit 15 to display the message received with the paging call signal, step 39, and, in step 40, returns to the standby state.

When the vibration mode is detected in step 33, control unit 13 controls multiplexer 42 to supply the $n_{th}$ voltage to motor driving unit 18. Initially, i.e., when a call is first received, n will have a value of 1 and the voltage provided by resistor R1 is supplied to motor driving unit 18. Control unit 36 then checks for activation of a vibration completion key or confirmation key in step 36. Once the vibration completion key or confirmation key is detected in step 36, control unit 13 stops motor driving unit from vibrating and controls display unit 15 to display the message received with the paging call signal, step 39, and, in step 40, returns to the standby state.

When control unit 13 fails to detect activation of the vibration completion key or confirmation key in step 36 selection value n is increased by 1, step 37, and compared to a value M, M being a value equal to the total number of selectable vibration levels, or resistors, in vibration level adjusting unit 17, step 38. Therefore, M would be equal to 6 according to the embodiment shown in FIG. 2. Each level of vibration voltage provided to motor driving unit 18 controls the vibration for a predetermined time period. Steps 35 through 38 are repeated until all the vibration voltage levels have been sequentially selected and, thus, n equals M in step 38, or until control unit 13 detects activation of the vibration completion key or confirmation key in step 36. When n is equal to M, control unit 13 controls display unit 15 to display the message received with the paging call signal, step 39, and, in step 40, returns to the standby state.

As is apparent from the above description, the present invention has an advantage in that a level of vibration can be sequentially raised, in the state where the paging receiver is set to a vibration mode, so that the paging receiver, according to the present invention, does not surprise or startle a user by an unexpected vibration.

While the present invention has been described above with reference to the preferred embodiment, it will be appreciated by those skilled in the art that various substitutions and modifications can be made, for example, resistors R1–R6 could each have the same value and be connected in series, without departing from the spirit and scope of the invention as set forth in the following claims.

What is claimed is:

1. A sequential vibration method of a paging receiver, said method comprising the steps of:

simultaneously generating a plurality of vibration voltages when said paging receiver receives a call and selectively supplying a first one of said vibration voltages to a vibrating motor of said paging receiver for a first predetermined time period;

selecting a second one of said vibration voltages, said second one of said vibration voltages having a voltage level greater than a voltage level of said first one of said vibration voltages, and supplying said second one of said vibration voltages to said vibrating motor during a second predetermined time period after said first predetermined time period has ended;

determining whether a vibration voltage having a final voltage level has been selected and supplied to said vibrating motor; and displaying a message received with said call when it is determined that said vibration voltage having said final voltage level has been selected and supplied to said vibrating motor.

2. The method as set forth in claim 1, further comprising the steps of:

determining whether a warning mode of said paging receiver has been set to operate in a vibration mode when said call has been received;

generating an audible alarm when it is determined that said warning mode has not been set to said vibration mode; and displaying said message after said audible alarm has been generated.

3. The method as set forth in claim 2, further comprising the steps of:

selecting a first vibration voltage having a first voltage level when it is determined that said warning mode has been set to said vibration mode;

determining, during a first time period whether a confirmation key has been activated;

determining, upon completion of said first time period when it is determined that said confirmation key has not been activated, whether said first vibration voltage is a final vibration voltage;

selecting a next vibration voltage having a next succeeding voltage level, each succeeding voltage level being greater than a preceding voltage level, when it is determined that said first vibration voltage is not said final vibration voltage;

determining, during a next time period whether said confirmation key has been activated;

determining, upon completion of said next time period when it is again determined that said confirmation key has not been activated, whether said next vibration voltage is said final vibration voltage;

returning to said step of selecting a next vibration voltage until it is determined that said next vibration voltage is said final vibration voltage; and displaying said message when said final voltage has been selected or when it is determined that said confirmation key has been activated.

4. The method as set forth in claim 3, further comprising the steps of: determining when a call is received while said paging receiver is in a standby state; and returning said paging receiver to said standby state after displaying said message.

5. The method as set forth in claim 1, further comprising the steps of:

determining whether a warning mode of said paging receiver has been set to operate in a vibration mode when said call has been received;

selecting a first vibration voltage having a first voltage level when it is determined that said warning mode has been set to said vibration mode;

determining, during a first time period whether a confirmation key has been activated;

determining, upon completion of said first time period when it is determined that said confirmation key has not been activated, whether said first vibration voltage is a final vibration voltage;

selecting a next vibration voltage having a next succeeding voltage level, each succeeding voltage level being greater than a preceding voltage level, when it is determined that said first vibration voltage is not said final vibration voltage;

determining, during a next time period whether said confirmation key has been activated;

determining, upon completion of said next time period when it is again determined that said confirmation key has not been activated, whether said next vibration voltage is said final vibration voltage;

returning to said step of selecting a next vibration voltage until it is determined that said next vibration voltage is said final vibration voltage; and displaying said message when said final voltage has been selected or when it is determined that said confirmation key has been activated.

6. The method as set forth in claim 1, further comprising the steps of: determining when a call is received while said paging receiver is in a standby state; and returning said paging receiver to said standby state after displaying said message.

7. A sequential vibration method of a paging receiver, said method comprising the steps of:

determining when a call is received while said paging receiver is in a standby state;

determining whether a warning mode of said paging receiver has been set to operate in a vibration mode when said call has been received;

simultaneously generating a plurality of vibration voltages, when it is determined that said warning mode has been set to said vibration mode;

selecting a vibration voltage having a predetermined voltage level when it is determined that said warning mode has been set to said vibration mode;

determining, during a first time period, whether a vibration completion key has been activated;

determining, upon completion of said first time period when it is determined that said vibration completion key has not been activated, whether said first vibration voltage is a final vibration voltage;

selecting a next vibration voltage having a next succeeding voltage level, each succeeding voltage level being greater than a preceding voltage level, when it is determined that said first vibration voltage is not said final vibration voltage;

determining, during a next time period, whether said vibration completion key has been activated;

determining, upon completion of said next time period when it is again determined that said vibration completion key has not been activated, whether said next vibration voltage is said final vibration voltage;

returning to said step of selecting a next vibration voltage until it is determined that next vibration voltage is said final vibration voltage;

displaying a message received with said call when it has been determined that said final voltage has been selected or when it is determined that said vibration completion key has been activated; and returning said paging receiver to said standby state after displaying said message.

8. The method as set forth in claim 7, further comprising the steps of:

generating an audible alarm when it is determined that said warning mode has not been set to said vibration mode; and displaying said message after said audible alarm has been generated.

9. A paging receiver having means for receiving a radio paging call, said radio paging receiver having a warning mode of operation when said radio paging call is received, said warning mode being one of an audible mode and a vibration mode, said paging receiver comprising:

control means for generating a control signal upon receipt of a radio paging call;

means for simultaneously generating a plurality of vibration voltages, each of said vibration voltages having a different voltage level; and selection means, responsive to said control signal, for sequentially selecting, over a given time period, each of said plurality of vibration voltages for output to a vibrating motor means, said selection means selecting a first one of said plurality of vibration voltages having a lowest voltage level when said radio paging call is initially received for vibrating said vibrating motor means at a lowest vibration level, and each succeeding vibration voltage sequentially selected by said selection means has a higher voltage level than a preceding vibration voltage for vibrating said vibrating motor means at sequentially higher vibration levels.

10. The paging receiver as set forth in claim 9, said means for generating a plurality of vibration voltages comprising:

means for generating a source voltage; and a plurality of resistors each having a different resistive value, each of said resistors having one end connected in common to said source voltage and an opposite end selectively connected to said vibrating motor means via said selection means in response to said control signal.

11. The paging receiver as set forth in claim 10, said selection means comprising a multiplexer having a plurality of input terminals, each of said input terminals being respectively connected to individual ones of said plurality of resistors, and an output terminal selectively connected to each of said input terminals in response to said control signal, said output terminal being further connected to said vibrating motor means.

12. The paging receiver as set forth in claim 9, said selection means comprising a multiplexer having a plurality of input terminals respectively supplied with said plurality of vibration voltages, and an output terminal selectively connected to each of said input terminals in response to said control signal, said output terminal being further connected to said vibrating motor means.

13. The paging receiver as set forth in claim 9, further comprising:

key input means for selecting one of said vibration and audible warning modes; and display means for displaying a message received with said radio paging call after a final one said vibration voltages has been provided to said vibrating motor means, said final one of said vibration voltages having a voltage level higher than any vibration voltage previously provided to said vibrating motor means.

* * * * *